United States Patent
Tripathi et al.

(10) Patent No.: US 9,465,801 B2
(45) Date of Patent: Oct. 11, 2016

(54) METHOD AND SYSTEM FOR AUTOMATIC PROCESSING AND MANAGEMENT OF TECHNICAL DIGITAL DOCUMENTS AND DRAWINGS

(71) Applicant: TRANSBIT TECHNOLOGIES SOFTWARE PRIVATE LIMITED, Hyderabad (IN)

(72) Inventors: Ritesh Tripathi, Hyderabad (IN); Rahul Bishnoi, Hyderabad (IN); Nitiraj Singh Rathore, Hyderabad (IN)

(73) Assignee: TransBit Technologies Software Private Limited, Hyderabad (IN)

( * ) Notice: Subject to any disclaimer, the term of this patent is extended or adjusted under 35 U.S.C. 154(b) by 93 days.

(21) Appl. No.: 14/164,074

(22) Filed: Jan. 24, 2014

(65) Prior Publication Data

US 2014/0214758 A1    Jul. 31, 2014

(51) Int. Cl.
G06F 7/00 (2006.01)
G06F 17/30 (2006.01)
G06Q 10/00 (2012.01)
G06Q 50/00 (2012.01)

(52) U.S. Cl.
CPC ......... *G06F 17/30011* (2013.01); *G06Q 10/00* (2013.01); *G06Q 50/00* (2013.01); *G06K 2209/01* (2013.01)

(58) Field of Classification Search
CPC .. G06F 17/30; G06K 2209/01; G06Q 10/10; G06Q 50/00
See application file for complete search history.

(56) References Cited

U.S. PATENT DOCUMENTS

| | | | | |
|---|---|---|---|---|
| 5,761,328 A * | 6/1998 | Solberg et al. | | 382/113 |
| 6,614,929 B1 * | 9/2003 | Yokota | | 382/175 |
| 8,554,576 B1 * | 10/2013 | Reicher et al. | | 705/3 |
| 2005/0166184 A1 * | 7/2005 | Takao | | 717/117 |
| 2006/0157559 A1 * | 7/2006 | Levy et al. | | 235/380 |
| 2007/0094296 A1 * | 4/2007 | Peters, III | | 707/102 |
| 2009/0052751 A1 * | 2/2009 | Chaney et al. | | 382/120 |
| 2009/0219567 A1 * | 9/2009 | Ishizaki | | 358/1.15 |
| 2010/0245938 A1 * | 9/2010 | Coley et al. | | 358/474 |
| 2011/0135209 A1 * | 6/2011 | Oba | | 382/224 |

* cited by examiner

*Primary Examiner* — Charles Lu
(74) *Attorney, Agent, or Firm* — Mark M. Friedman

(57) ABSTRACT

The embodiments herein provide a method and system for automating the document control business process in an organization particularly the ones that are operating in construction, resources, energy, infrastructure and/or large capital expenditure projects. This computer implemented method and system fetches information and data from the different data sources including file attachments as exchanged between organizations via E-mails, web-applications, and/or other data sources, automatically identifies and extracts data from inside the files/data received, performs data quality checks and validations as per business process requirements and updates organizational records with minimal human intervention. The business logic and rules are applied on the information to create automatically the business deliverables as reports, document transmittal notes, and acknowledgement letters etc., that are expected from a well-functioning document control center in an organization.

12 Claims, 14 Drawing Sheets

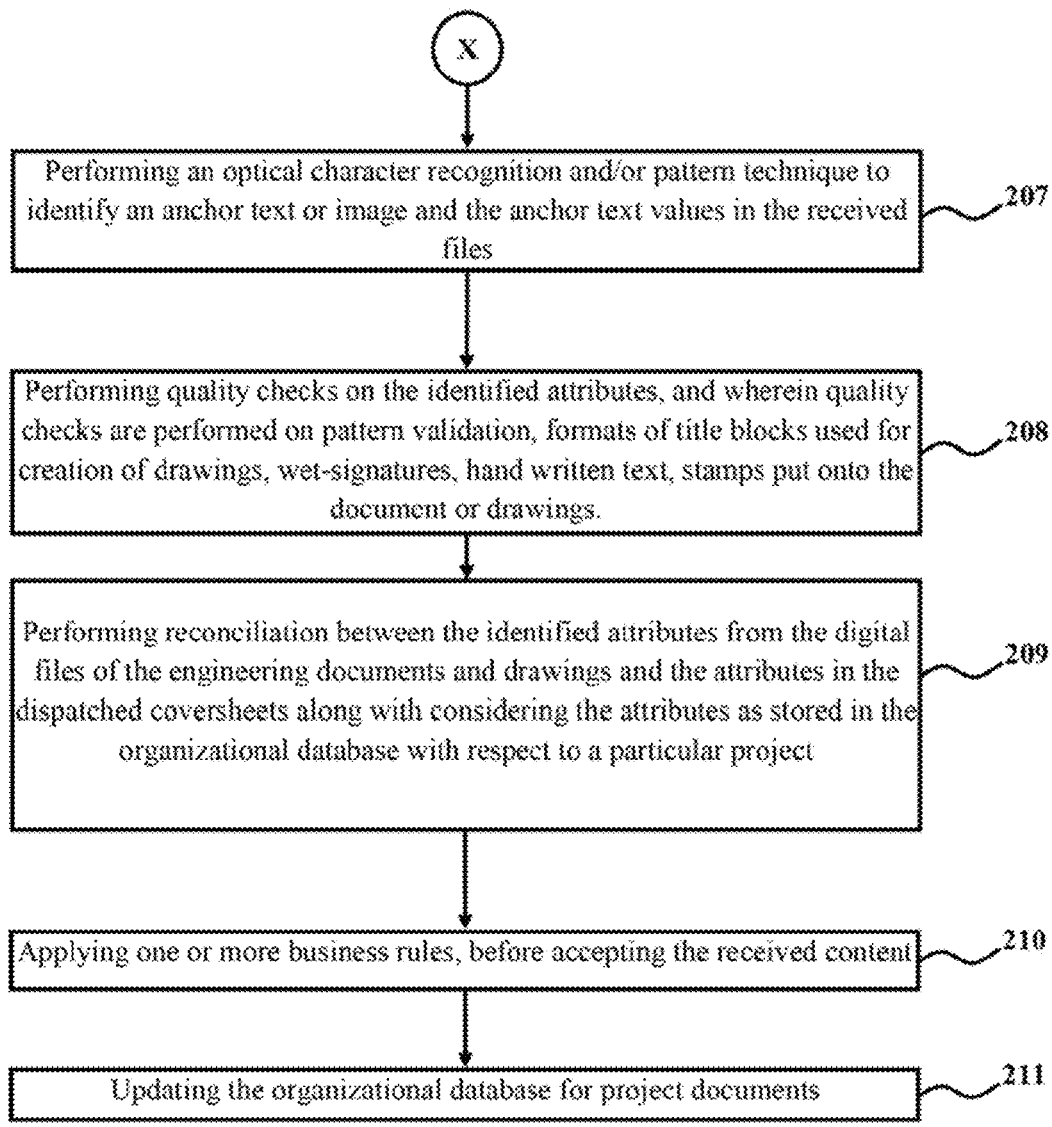
FIG. 2 (CONTD)

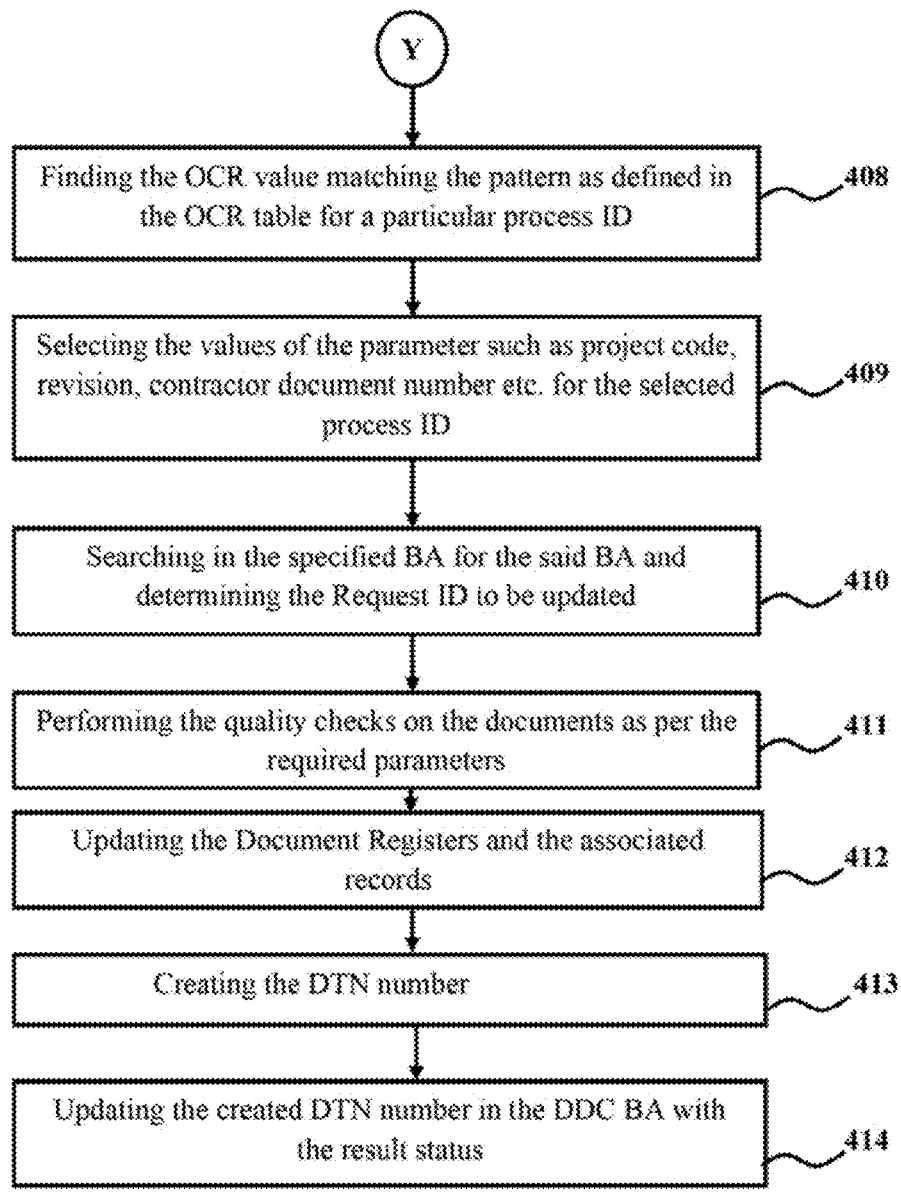
FIG. 4 (CONTD)

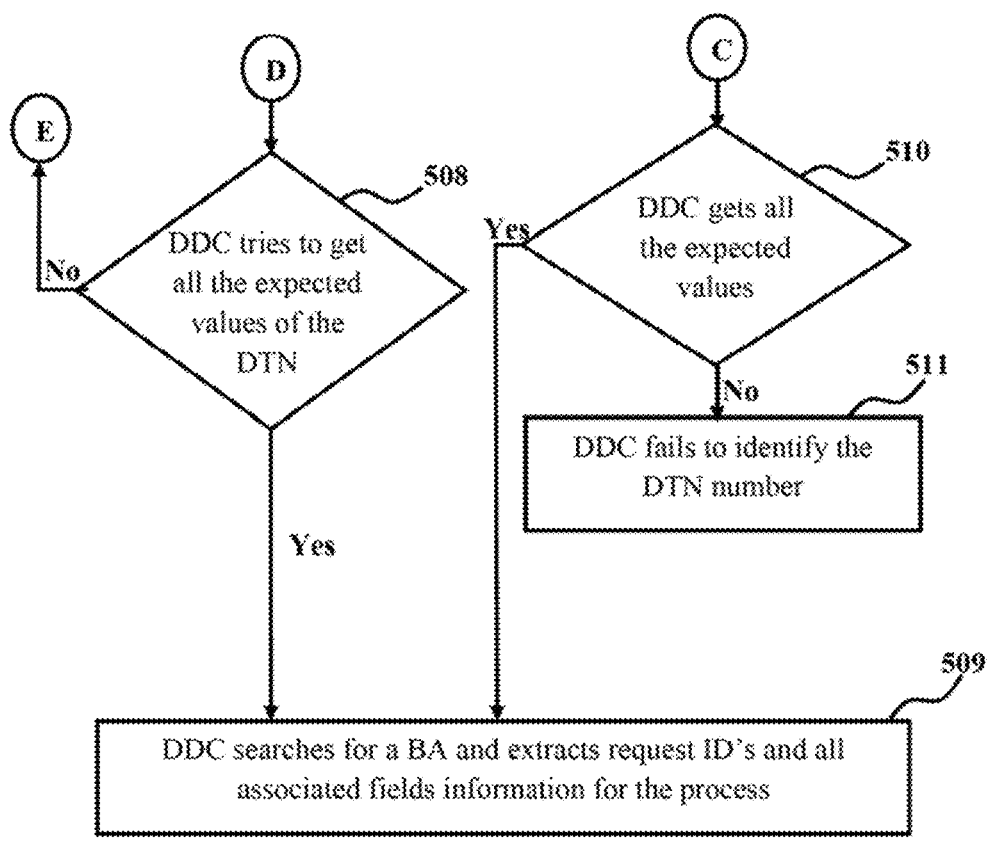
FIG. 5 (CONTD)

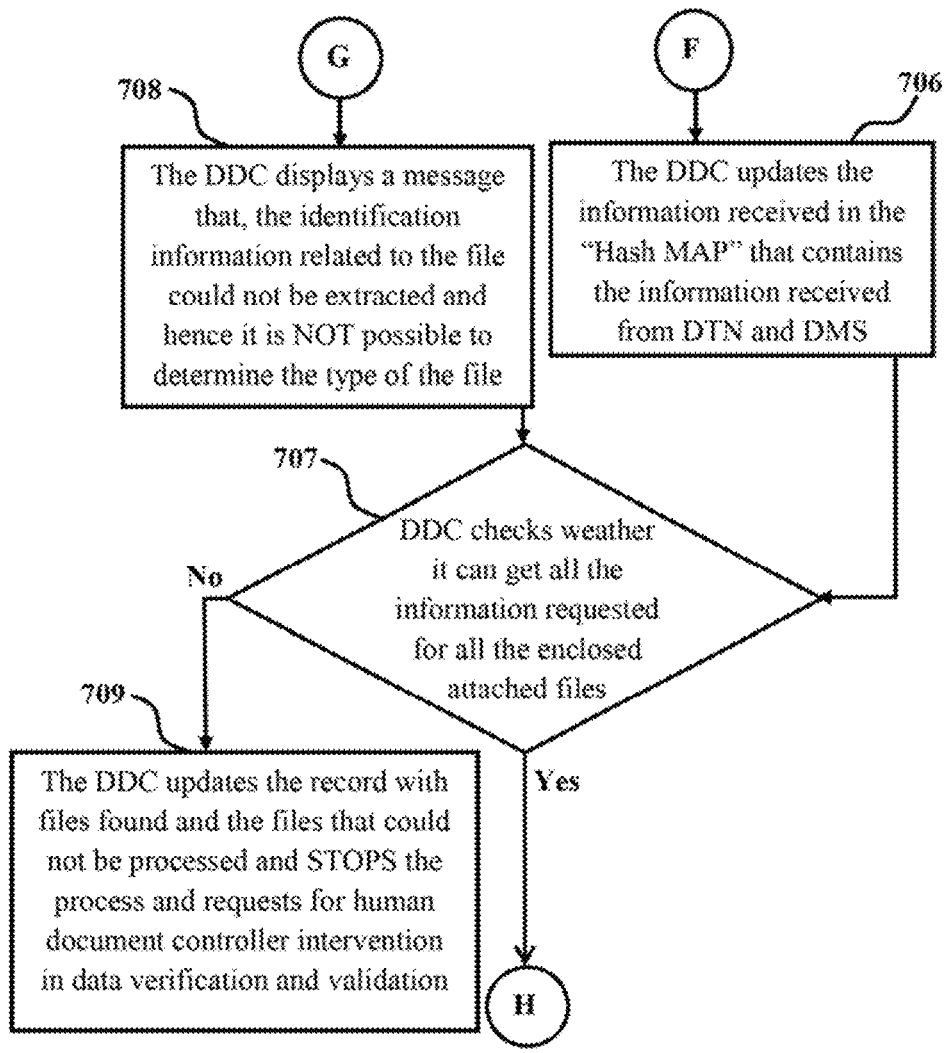
FIG. 7 (CONTD)

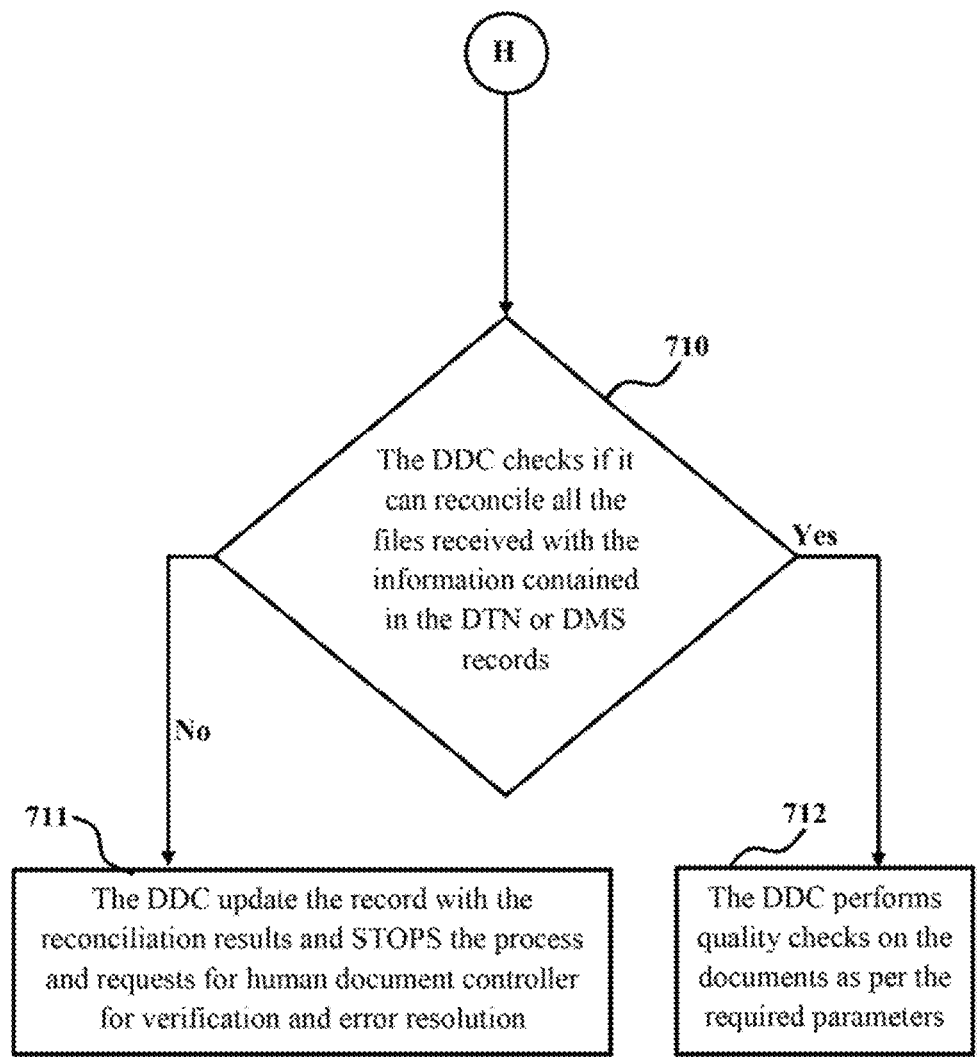
FIG. 7 (CONTD)

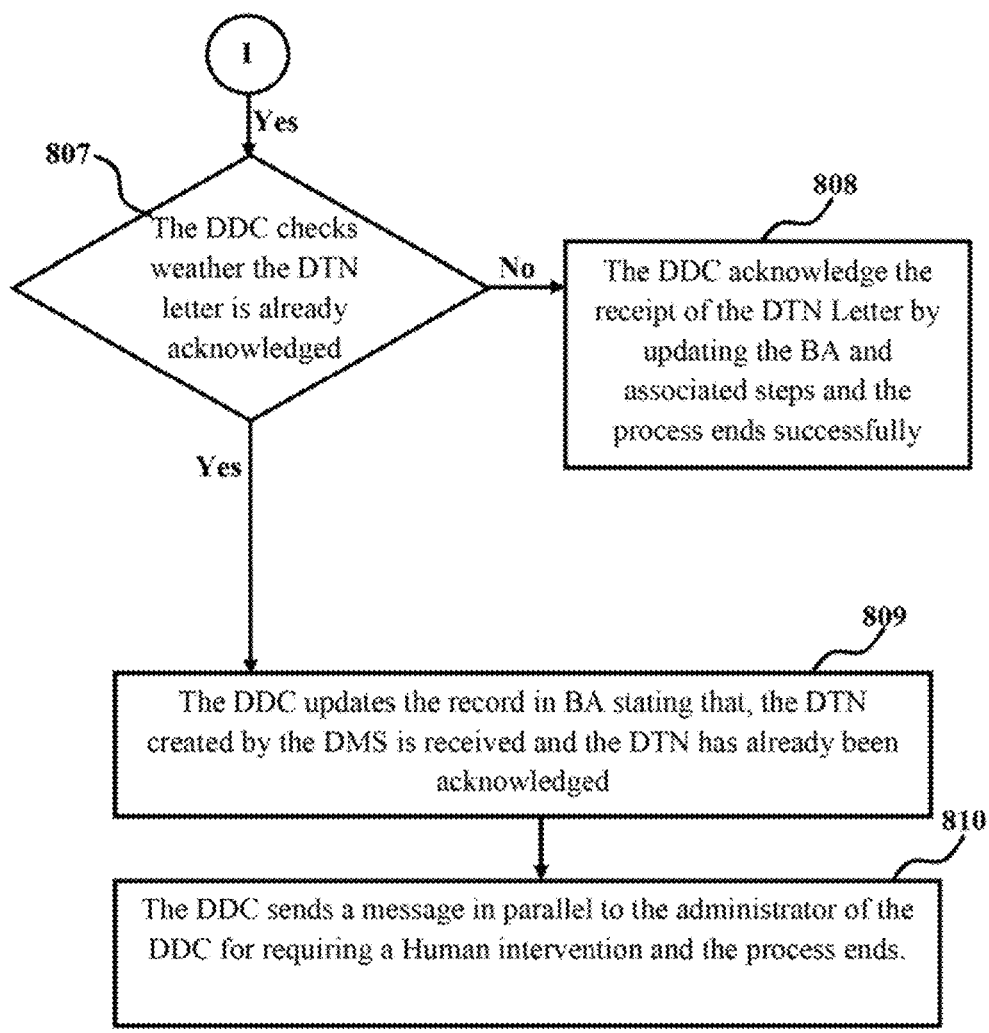
FIG. 8 (CONTD)

METHOD AND SYSTEM FOR AUTOMATIC PROCESSING AND MANAGEMENT OF TECHNICAL DIGITAL DOCUMENTS AND DRAWINGS

CROSS REFERENCE TO RELATED APPLICATION

The present application claims the priority of Indian Provisional Patent Application with serial number 4978/CHE/2012 filed on Nov. 29, 2012, with a priority date of Jan. 29, 2013 and the content of which is incorporated in its entirety by reference.

BACKGROUND

1. Technical Field

The embodiments herein are generally related to an information processing system and particularly related to a method and system for managing and controlling the digital documents and drawings and their associated contents. The embodiments herein are more particularly related to a method and system for automatic processing, extracting, monitoring, tracking and controlling the technical documents and drawings and their exchange between the various entities which are internal and external to an organization.

2. Description of the Related Art

In the execution of a large scale project in infrastructure domain as in Energy, Transportation, Resources, Industrial Infrastructure, Residential Infrastructure, Process Plants, Defense, Medicine and Healthcare, etc., various organizations and individuals provide the services and equipments required for a successful execution of the projects.

For the successful execution of the project, these organizations and individuals exchange a large amount of data including technical drawings and documents. Correspondences and Letters, Minutes of Meetings, Design Change Notes, Technical Queries and their responses, Reviews, Comments, Audits and associated business documents and data in between themselves to enable conceptualization, design, development and commissioning of these projects. The volume and type of information exchanged is very large and the management of this information in a controlled and systematic manner is critical for the successful execution of the project complying with the constraints as mentioned in the project plan and contract documents.

As the organizations and individuals participating in the project also share the risks associated with the project delay in form of penalties and liquidated damages as specified in the contract, the management of these records assumes a paramount importance during the project closure. If there are any claims or counterclaims, deductions and any other form of liability be financial or otherwise during the project closure, these records serve as an evidence on the basis of which the work was executed and assist in a fair-settlement either mutually and/or using arbitration or legal remedies as provided by the law.

To manage this large amount of varied data that is being exchanged between the various institutions or departments or people or organizations involved in the execution of the project, there are rules and guidelines that are agreed between the participating institutions or departments or people or organizations related to the need, identification, generation, quality checks, interchange, monitoring and tracking of all project information.

There are dedicated departments and people who perform the operations related to the management of information and data in compliance with the guidelines and standards for information management as has been agreed between the various parties involved in the project.

These departments and people normally referred as "Document Control Centers" and "Document Controllers" respectively in the industrial parlance, work to ensure a compliance with the standards of document control as has been set by the project authorities.

In certain cases, the document control centers also perform the work associated with the translation of language when the participating agencies are from various lingual backgrounds and other general administrative activities.

The work related to the document control, largely encompasses the operations related to the receipt, dispatch, acknowledgement, quality checks, internal forwarding to the concerned people and managing records of all data interchanged data including the dates and reference number of letters for ensuring transparency, traceability, search and reporting.

In the earlier days, when the information interchanged was on paper, the document control center was responsible for the management of the hardcopy of documents. They used to receive the information along with the cover note referred as Document Transmittal Note (DTN) with a unique number, along with a set of hardcopy documents, each having their own identification. The details related to the identification were listed in the documents in the formats known as Title Blocks for drawings and Cover-Sheets for Documents that usually follows a predictable structure and information which many a times is standardized for particular projects. The document controllers are used to validate the information received as listed in the Document Transmittal Note with the enclosures, and ensure that all the information mentioned in DTN matches with that received. If there are any discrepancies, letters are issued to the originators listing the discrepancy and seeking remedy. If the things are in order, then quality checks are performed on the documents and per project and organizational policies. When the entire information received is passed successfully through all their quality tests, the document is updated in the document control registers by putting in the dates, and DTN references and other information extracted from the drawings and documents. Then the received information is circulated to the concerned people, and the superseded drawings and documents are withdrawn from circulation to ensure that all people receive the latest available information and issue the acknowledgement to the sender of information. The document control center also publishes the reports and sends reminders to the internal and external agencies about the items that are expected and/or overdue for expediting the overall information required for the execution of the project. The document control centers also perform the reconciliation of their records with those of suppliers to ensure the integrity of their records. These records serve as a place where the organizational intellectual property is captured and maintained. This information can be leveraged for newer projects by learning from the mistakes. The document control center hence for all the projects also maintain a library of these records. These records also provide the entire information which is important for the operation and maintenance of the assets created during the life time of the asset.

With the advances in the technology, paper based records are now generated from computer outputs and are exchanged using the appropriate methods for the digital exchange of information as E-mails (with files enclosed as attachments) or FTP Servers or Web-based applications.

Usually the files that are exchanged are in un-editable formats as Portable Document Formats (PDF), TIFF Image etc., unless they are final deliverables from one agency to another.

Further, the manual paper based registers have been replaced with digital registers that is maintained in software spreadsheet application and/or databases applications.

Some firms have come up with the web-based collaborative workspaces where all agencies involved in the project can come and upload all the information or data for the specified project. Such applications can be of web-based applications hosted either by one of the project agencies and/or commercial firms offering such services. The inherent drawback associated with such applications and methodology is that all the project organizations end up with the duplication of data entry in both their internal as well as the common system. The firms have further come up with Application Programming Interfaces (API) for their applications to reduce the double entry of data but the usage of large number of varied systems in the industry and lack of standardization imply that such integrations are practically never executed.

In a practical scenario, almost all the projects ends using an application which is standardized for the exchanges of data and documents across the organizations primarily E-mail—working on standard protocols and incase the data size is too high to be handled by E-mail—due to attachment size limitations some standardized methodology for file exchange such as FTP or HTTP applications.

The impact of the above lack of standards for in formation exchange in the industry due to the varied reason simply that the document control processes largely remain the same in terms of document control methodology and standards that were applicable to paper based documents. The challenge is further exacerbated by the fact that the document control standards that are applicable to the management of project information vary from project to project and are a function of standards that are agreed between the project owners and participating agencies. The abovementioned facts imply that the work related to the document control largely remains manual where the document controller performs the various responsibilities according to the project and organizational requirements and is aided by software tools such as email systems and databases. However, the quality checks and data entry aspects etc. largely remain manual in nature and are error-prone.

One of the existing prior arts provides software based automatic document processing and management services. This prior art essentially provides an ability to scan the documents, to extract information from forms and then stores the same in a database. This prior art provides services in terms of Form Processing such as Invoice Processing, Classification of documents for human review, sending and receiving electronic invoices, etc., but is not capable of processing the technical drawings and documents and associated functions as detection of decision stamps put on drawings etc cannot be handled. The prior art is primarily concerned with the extraction of the information from the scanned documents and automatically pre-fills the fields as available in the software program to reduce the human effort involved in data entry. The human intervention is however expected in reviewing the information filled in the software forms, validating the same and then submitting the same into the software as ERP. The Prior Art doesn't discuss the complexity associated with the varied project data management standards that are applicable to the projects including the methodologies that are specifically required for extracting the meaningful information from decision stamps that are used in the engineering projects and its correlation with the project based standards including quality checks on the existing files, the prior history of the document exchanges performed on the specific records and associated aspects.

Another prior art discloses a method and system for monitoring and detecting the documents sent and received over E-mails. This prior art monitors the incoming and outgoing mails, compares the same with the documents stored in a database, and finally generates a report. The prior art is related to the exchange of files via E-mail. When a response E-mail is received on the basis of comparison and difference, the prior art does not discuss the automatic processing of the attached documents in the E-mail.

Another prior art discusses the challenges associated with the processing of technical engineering drawings and documents, particularly the ones which are scanned from the paper documents and converted into digital files. The current innovation also improves the method for extraction of meaningful information from the scanned technical drawings by compensating for the errors associated with scanning and non-compliance with the standards related to the technical drawings and documents in a project.

Hence, there is a need for a system and method for automatically controlling the digital documents exchanged during the execution of a project communicated via various methods including E-mails to the various organizations. Further, there is also a need for a system for processing the data extracted from the various digital files that are received and in compliance with the project and organizational standards to automate the document control processes of the organization.

The above mentioned shortcomings, disadvantages and problems are addressed herein and which will be understood by reading and studying the following specification.

OBJECTIVES OF THE EMBODIMENTS

The primary object of the embodiments herein to provide a method and system for automatically processing and managing project documents and drawings by improving the productivity of the teams involved in the document control and document management business process.

Another object of the embodiments herein is to provide a method and system for automatically controlling the quality of incoming and outgoing documents and drawings that are in compliance with the standards and processes as mandated by the organization for the specific projects.

Yet another object of the embodiments herein is to provide a method and system for identifying information from the technical drawings and documents by automatically compensating for the deviations and errors associated with the scanned documents.

Yet another object of the embodiments herein is to provide a method for checking the revisions or modified versions of the documents from the hardcopy documents circulated in the field by reading the embedded code on the document by the mobile devices and network-connectivity available on the mobile devices.

Yet another object of the embodiments herein is to reduce the effort and errors associated with incorrect data entry done by the human document controller by extracting the information from engineering drawings and documents and displaying the regions or letters whose probability for correct identification is lower than provided threshold for verification and validation to be performed by Human Document Controller.

These and other objects and advantages of the embodiments herein will become readily apparent from the following detailed description taken in conjunction with the accompanying drawings.

SUMMARY

The embodiments herein provide a computer implemented method executed on a computing device for an automatic processing and management of technical digital documents and drawings. According to an embodiment herein, the method comprises the steps of receiving one or more digital files of engineering digital documents and drawings from a plurality of sources. The plurality of sources is selected from a group consisting of scanners, email servers, and various applications. One or more digital files of engineering digital documents and drawings are received using a plurality of methods. The plurality of methods comprises various application based on digital data transfer protocols including WebDav, FTP, HTTP, UDP etc. A queue is created for processing the received engineering drawings and documents by creating a record in an incoming database. The contents of the received digital files are read to determine a project to which the digital files of the engineering documents and drawings belong, and the contents include the source from where the data was received besides data contained inside the drawings/documents. The digital files comprise a cover letter enclosed by a dispatching agency, one or more drawing files and one or more documents. The contents of the received cover letter are read and the attributes of the one or more drawing files and one or more documents are read. The attributes include the contents provided in a Title Block of Drawings or Cover Page of Documents. The attributes of the received digital files are identified using one or more image analysis techniques. The one or more image analysis techniques are selected from a group consisting of an edge detection technique, pattern recognition, an optical character recognition etc. The optical character recognition technique is performed to identify an anchor text and the anchor text values in the received files. The quality checks are performed on the identified attributes in the digital files, dispatch cover sheets and previous transactions. The quality checks include performing a pattern validation, checking the formats of title blocks used for creation of the drawings, checking the wet-signatures, checking a hand written text and checking the stamps put on the received documents and drawings; performing a reconciliation between the identified attributes from the digital files of the engineering documents and drawings and the attributes in the dispatched coversheets (DTN's), and comparing the reconciliation information with an information stored in an organizational database with respect to the received drawings including their prior history of interchange; applying one or more business rules, before accepting the received content; and updating the organizational database for project documents.

According to one embodiment herein, the relevant data points are referred to a human document controller for validation, verification and error resolution, when the fidelity of the data identified from coversheets and/or received digital files is less than a prescribed threshold value and/or missing data-points or logical inconsistencies are identified at any point in a process flow. Further the transactions are further processed and executed based on the inputs of the human document controller, and wherein the prescribed threshold value is set by the administrator of the application. The human document controller is shown the image as well as interpreted text by the digital document controller and even words, where the probability of error that are highest are highlighted for Human Document Controller intervention.

According to one embodiment herein, the engineering documents comprise a plurality of digital files with a plurality of pages. The plurality of pages comprises one or more images, labels and stamps.

According to one embodiment herein, an acknowledgment is sent to a recipient, when one or more digital files of engineering documents and drawings are received and successfully updated in the organizational database of the engineering drawings and documents.

According to one embodiment herein, the pre-processing of the plurality of images comprises a processing of resolution, orientation, pattern identification, edge detection, and table detection etc of the plurality of images.

According to one embodiment herein, the one or more business rules are applied on the identified attributes of the digital files of the engineering documents and drawings to carry out a quality check. The quality check comprises checking decision codes, checking stamps put onto a plurality of drawings and a plurality of documents, checking compliance with a file naming convention, checking a document numbering system protocols, revisions and previous transactions. The previous transactions include transactions that are performed on the same documents and drawings within project stakeholders. The documents and drawings are routed to a concerned person within organization for review after the successful entry of the drawings in the document control registers.

According to one embodiment herein, the attributes of the digital files comprises a document number, a document revision, a decisions written on the documents, a title block, a stamp, a report, a cover sheet and a project details.

According to one embodiment herein, the anchor text is a standard text or a pattern or image that is expected to be found in a specified class of the engineering drawings and documents, within the defined regions of the image.

According to one embodiment herein, the human document controller is a person entrusted with the responsibility of checking all the incoming digital files and the updation of the digital files in the organizational database.

According to one embodiment herein, a format of the plurality of documents and drawings is changed in accordance with project standards. When the plurality of documents and drawings are sent from the document management system. The changing of the format of the plurality of documents and drawings comprises steps of creating coverpages, creating document transmittal notes, affixing decision stamps on the engineering drawings and documents, and embedding identification codes. The identification code is selected from a group consisting of QR Code, Bar code and Color code.

According to one embodiment herein, in case of errors in data or incase of the probability of correctness of data identified is lower than the prescribed threshold, the process of data validation is initiated by the concerned document controller.

According to one embodiment herein, identifying structures on the plurality of images comprises identifying edges of the plurality of images, absolute parameter and attributes, horizontal lines, vertical lines, white spaces, tables and stamps. The stamps includes decision codes, strings, date formats, paragraphs, phone numbers, currency, barcodes, colors and collection of similar objects and repeatable patterns.

According to one embodiment herein, the pluralities of documents are structured docents and semi-structured documents. In structured documents and semi-structured documents. In the structured documents, the locations on the image between the various elements to be identified are fixed and in the semi-structured documents, the locations on the image of the various elements to be identified vary.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiments and the accompanying drawings in which.

Figure 1:
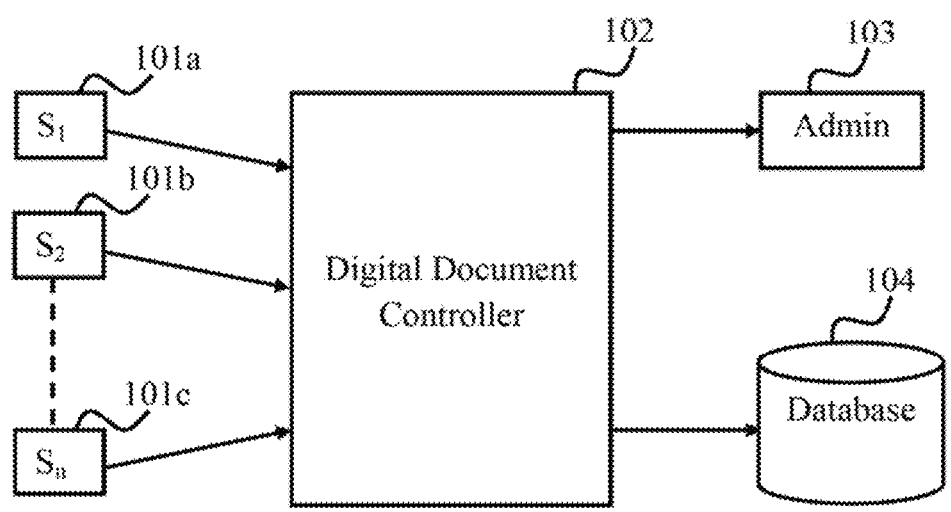
FIG. 1 illustrates a block diagram of the system for automatic processing and management of technical digital documents and drawings, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a computer implemented method executed on a computing device for an automatic processing and management of technical digital documents and drawings. The method comprises the steps of receiving one or more digital files of engineering digital documents and drawings from a plurality of sources. The plurality of sources is selected from a group consisting of scanners, email servers, and various applications. One or more digital files of engineering digital documents and drawings are received using a plurality of methods. The plurality of methods comprises various application based on digital data transfer protocols including WebDav, FTP, HTTP, UDP etc. A queue is created for processing the received engineering drawings and documents by creating a record in an incoming database. The contents of the received digital files are read to determine a project to which the digital files of the engineering documents and drawings belong. The digital files comprise a cover letter enclosed by a dispatching agency, one or more drawing files and one or more documents. The contents of the received cover letter are read and the attributes of the one or more drawing files and one or more documents are read. The attributes include the contents provided in a Title Block of Drawings or Cover Page of Documents. The attributes of the received digital files are identified using one or more image analysis techniques. The one or more image analysis techniques are selected from a group consisting of an edge detection technique, pattern recognition, an optical character recognition etc. The optical character recognition technique is performed to identify an anchor text and the anchor text values in the received files. The quality checks are performed on the identified attributes in the digital files, dispatch cover sheets and previous transactions. The quality checks include performing a pattern validation, checking the formats of title blocks used for creation of the drawings, checking the wet-signatures, checking a hand written text and checking the stamps put on the received documents and drawings; performing a reconciliation between the identified attributes from the digital files of the engineering documents and drawings and the attributes in the dispatched coversheets (DTN's), and comparing the reconciliation information with an information stored in an organizational database with respect to the received drawings including their prior history of interchange; applying one or more business rules, before accepting the received content; and updating the organizational database for project documents.

According to one embodiment herein, the relevant data points are referred to a human document controller for validation, verification and error resolution, when the fidelity of the data identified from coversheets and/or received digital files is less than a prescribed threshold value and/or missing data-points or logical inconsistencies are identified at any point in a process flow. Further the transactions are further processed and executed based on the inputs of the human document controller, and wherein the prescribed threshold value for routing the drawings for human validation and verification is set by the administrator of the application. The human document controller is shown the image as well as interpreted text by the digital document controller and even words, where the probability of error that are highest are highlighted for Human Document Controller intervention.

According to one embodiment herein, the engineering documents comprise a plurality of digital files with a plurality of pages. The plurality of pages comprises one or more images, labels and stamps.

According to one embodiment herein, an acknowledgment is sent to a recipient, when one or more digital files of engineering documents and drawings are received and successfully updated in the organizational database of the engineering drawings and documents.

According to one embodiment herein, the pre-processing of the plurality of images comprises a processing of resolution, orientation, pattern identification, edge detection, and table detection etc of the plurality of images.

According to one embodiment herein, the one or more business rules are applied on the identified attributes of the digital files of the engineering documents and drawings to carry out a quality check. The quality check comprises checking decision codes, checking stamps put onto a plurality of drawings and a plurality of documents, checking compliance with a file naming convention, checking a document numbering system protocols, revisions and previous transactions. The previous transactions include transactions that are performed on the same documents and drawings within project stakeholders. The documents and drawings are routed to a concerned person within organization for review after the successful entry of the drawings in the document control registers.

According to one embodiment herein, the attributes of the digital files comprises a document number, a document revision, a decisions written on the documents, a title block, a stamp, a report, a cover sheet and a project details.

According to one embodiment herein, the anchor text is a standard text or a pattern or image that is expected to be found in a specified class of the engineering drawings and documents, within the defined regions of the image.

According to one embodiment herein, the human document controller is a person entrusted with the responsibility of checking all the incoming digital files and the updation of the digital files in the organizational database.

According to one embodiment herein, a format of the plurality of documents and drawings is changed in accordance with project standards, when the plurality of documents and drawings are sent from the document management system. The changing of the format of the plurality of documents and drawings comprises steps of creating coverpages, creating document transmittal notes, affixing decision stamps on the engineering drawings and documents, and embedding identification codes. The identification code is selected from a group consisting of QR Code, Bar code and Color code.

According to one embodiment herein, sending the error notification to the Human Document Controller and initiating the process of verification and validation. The application displays the image and interpreted text to Human Document Controller for him/her to correct the errors and proceeding with the execution of the transaction based on human inputs.

According to one embodiment herein, identifying structures on the plurality of images comprises identifying edges of the plurality of images, absolute parameter and attributes, horizontal, lines, vertical lines, white spaces, tables and stamps. The stamps includes decision codes, strings, date formats, paragraphs, phone numbers, currency, barcodes, colors and collection of similar objects and repeatable patterns.

According to one embodiment herein, the pluralities of documents are structured documents and semi-structured documents. In the structured documents, the locations on the image between the various elements to be identified are fixed and in the semi-structured documents, the locations on the image of the various elements to be identified vary.

According to one embodiment herein, the method for handling and controlling digital documents is termed as "Digital Document Controller" (DDC). The DDC is largely directed towards the complete automation of the document control practices and procedures as is generally encountered in the project and associated industries. The method of the present invention acts on the information that is received via E-mail and/or from other data sources and applicable data transfer methods.

FIG. 1 illustrates a block diagram of the system for automatic processing and management of technical digital documents and drawings, according to one embodiment herein. The system for automatic processing and management of technical digital documents and drawings comprises a plurality of sources such as but not limited to scanners ($S_1$) 101a, email servers ($S_2$) 101b, applications ($S_n$) 101c for receiving one or more digital files of engineering digital documents and drawings, a digital document controller 102 for controlling and managing one or more digital files of engineering digital documents and drawings, a database 104.for storing extracted data as well as images of engineering drawings and documents. An administrator or a human document controller 103 is contacted for validation, verification and error resolution, when the fidelity of the data identified from coversheets and/or received digital files is less than a prescribed threshold value and/or missing data-points or logical inconsistencies or identified at any point in a process flow.

Figure 2:
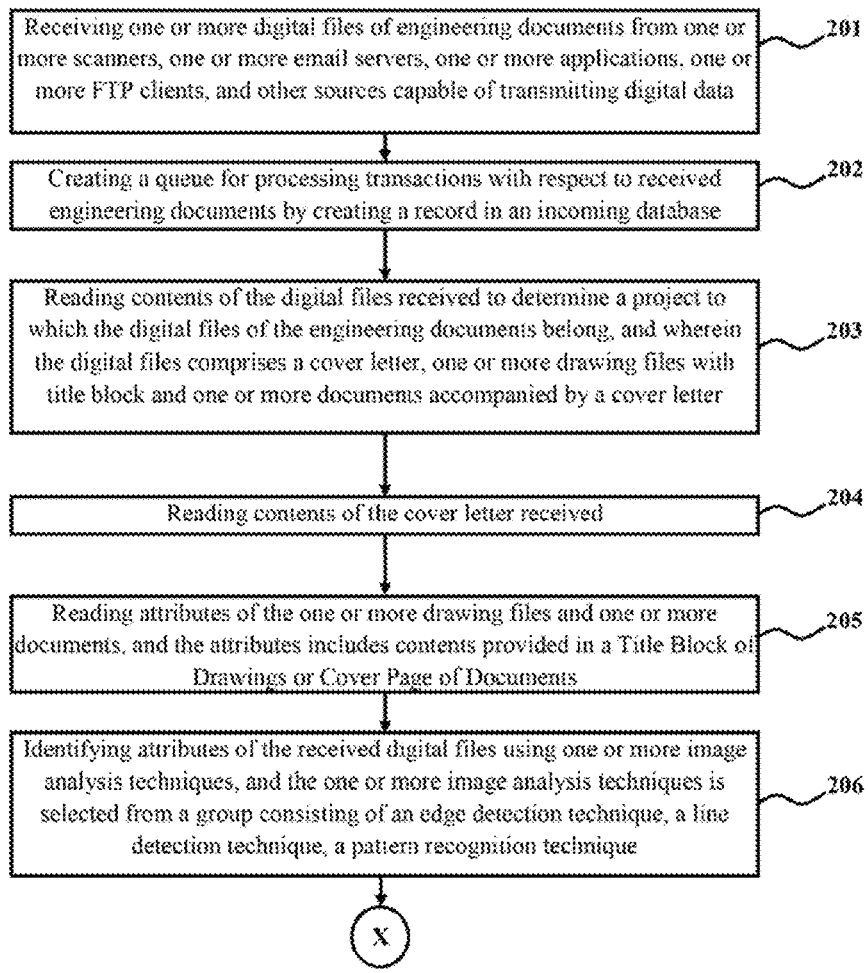
FIG. 2 illustrates a flowchart explaining a method for automatic processing and management of technical digital documents and drawings, according to one embodiment herein.

FIG. 2 illustrates a flowchart explaining a method for automatic processing and management of technical digital documents and drawings, according to one embodiment herein. The method for automatic processing and management of technical digital documents and drawings comprises the steps of receiving one or more digital files of engineering digital documents and drawings from a plurality of sources, and the plurality of sources is selected from a group consisting of scanners, email servers, applications. One or more digital files of engineering digital documents and drawings are received using a plurality of methods, and the plurality of methods comprises protocols, and the protocols includes WebDav, FTP and other sources capable of transmitting digital data (201). A queue is created for processing the received engineering drawings and documents by creating a record in an incoming database (202). The contents of the received digital files are read to determine a project to which the digital files of the engineering documents and drawings belong. The contents include a source of origination, and the digital files comprises a cover letter enclosed by a dispatching agency, one or more drawing files with title block and one or more documents accompanied by a cover letter (203). The contents of the received cover letter are read (204). The attributes of the one or more drawing files and one or more documents are read. The attributes includes the contents provided in a Title Block of Drawings or Cover Page of Documents (205). The attributes of the received digital files are identified using one or more image analysis techniques, and the one or more image analysis techniques is selected from a group consisting of an edge detection technique, a line detection technique, a pattern recognition technique (206). An optical character recognition and/or pattern or image matching technique is performed to identify an anchor text and the anchor text values in the received files (207). The quality checks are performed on the identified attributes in the digital files, dispatch cover sheets and previous transactions. The quality checks includes performing pattern validation, checking formats of title blocks used for creation of drawings, checking we-signatures, checking hand written text and checking stamps put on the received documents and drawings (208). Reconciliation is performed between the identified attributes from the digital files of the engineering documents and drawings and the attributes in the dispatched coversheets to ensure that what has been dispatched in what has been received. The reconciliation information is compared with the information stored in an organizational database with respect to a particular project for the received drawings and documents (209). One or more business rules are applied before accepting the received content (210) and the organizational database is updated for project documents (211).

According to one embodiment herein, the identification of attributes of the received digital files comprises detecting edge of the image, anchor text such as but not limited to document number, absolute parameters/attributes, decision codes, horizontal lines, vertical lines, white spaces, table grids, text strings, date formats, paragraphs, phone numbers, currency symbols, barcodes, colors and collection of similar objects and repeatable patterns, stamps and color.

Figure 3:
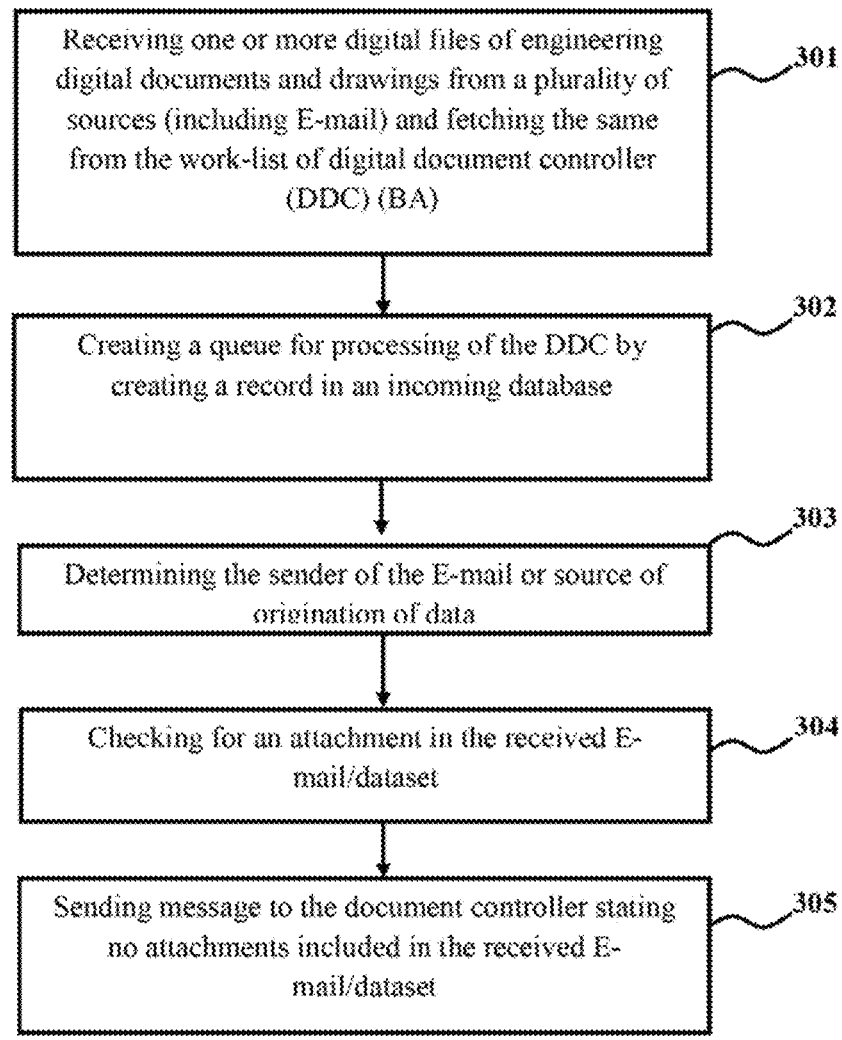
FIG. 3 illustrates a flowchart explaining a method for handling and managing digital documents in case E-mail or received dataset does not contain any attachments, according to one embodiment herein.

FIG. 3 illustrates a flowchart explaining a method for handling and managing digital documents when the E-mail or received dataset does not contain any attachments, according to one embodiment herein. The method for handling and managing digital documents in case E-mail or received dataset does not contain any attachments comprises the steps of (the method is not limited to email alone but can equally well be applied to, web-application/FTP Folder etc.,) receiving the information through an E-mail and/or from other data sources in the inbox related to the digital document controller Business Activity Area (BA) and fetching the E-mails from the inbox (301), and creating a queue for processing of the DDC by creating a record in an incoming database (302). The source of information is identified to determine the sender of the E-mail (303). An attachment in the received E-mail/dataset is checked (304) and a message or the E-mail is sent to the document controller to notify that no attachment is included in the received E-mail (305).

According to one embodiment herein, the information is received in the digital document controller Business Activity Area (BA) (301). The information along with the files can come from varied sources as emails, scanners, and other data transmission technologies as FTP, HTTP, UDP etc. The complete set of information that is received is stored as a record in the digital document controller.

According to one embodiment herein, the received F-mails or dataset are fetched from the inbox or corresponding origination points and a record is created in the business area for the processing of the digital document controller. Further, an acknowledgement is sent to the sender if required (302).

According to one embodiment herein, the DDC identifies the source of the information i.e. determines the sender of the E-mail (303). The DDC further compares the sender information with the allowance processes (i.e. From_Agency_E-mail_Address:) to determine the options allowable for processing of information on the basis of pattern defined in database/configurations.

According to one embodiment herein, the DDC checks weather the received E-mail contains any attachment (304).

According to one embodiment herein, if the received E-mail does not contain any attachment, then the DDC terminates the completely automated process and invokes data validation and verification module requesting the intervention from the human document controller.

According to one embodiment herein, a receipt of the email is also be regarded as a signal for system to download the attachments from external applications such as FTP, Web-Applications etc., incase other agencies upload the data somewhere else and send a notification for uploaded dataset.

Figure 4:
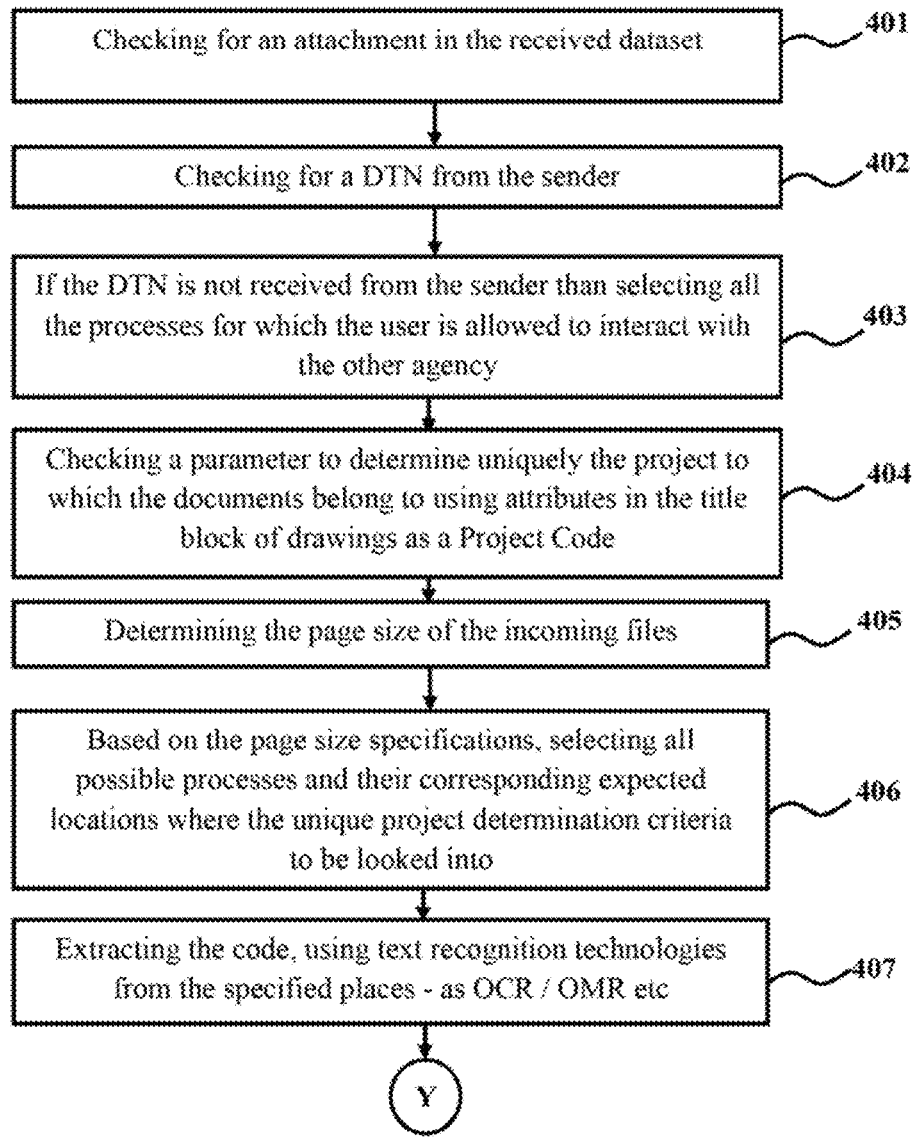
FIG. 4 illustrates a flowchart explaining is a flowchart illustrating a method for handling and managing digital documents in case of E-mail or received dataset containing attachments and not the DTN from the sender, according to one embodiment herein.

FIG. 4 illustrates a flowchart explaining a method for handling and managing digital documents when the received E-mail or dataset contains attachments and does not contain DTN from the sender, according to one embodiment herein. The method comprises the steps of: checking for an attachment in the received dataset (401). A DTN from the sender is checking for in the attachments of the received E-mail or dataset (402). When the DTN is not received from the sender then all the processes for which the user is allowed are selected and carried out to interact with the other agency (403). A parameter such as project code is checked for to determine the project to which the documents/drawings belong—for example, the project code is checked for to identify uniquely the project and associated allowable methods for processing the information for the selected processes (404). The page size of the incoming files is determined (405). All possible processes and their corresponding expected locations where the unique project determination criteria can be looked are selected based on the page size specifications (406). A code as OCR/OMR etc is extracted using text recognition technologies from the specified places as per pre-configured expected layouts of the images (407). The OCR value matching the pattern as defined in the OCR table is found out for a particular process ID (408). The values of the parameter project code, revision, contractor document number etc., are selected corresponding to the selected process ID (409). The said BA is searched for in the specified BA and the Records ID to be updated are determined (410). The quality checks are performed on the documents as per the required parameters (411). The document register and the associated records are updated (412). The DTN number is created (413) and the created DTN number is updated in the Document Management System (DMS) with the result status (414). If the system is able to get all the parameters required to perform the transaction, then the steps from 410 to 414 are repeated, irrespective if the email or dataset is received from internal or external sources.

Figure 5:
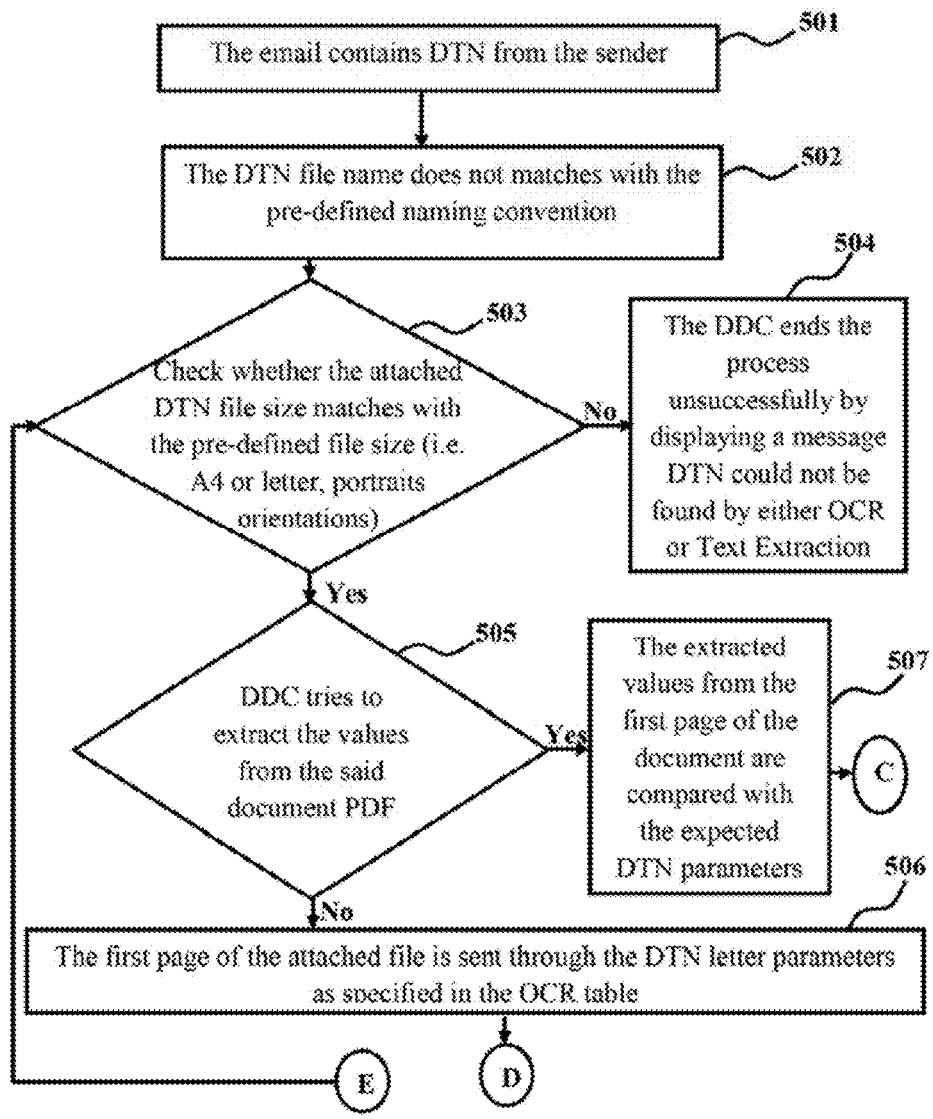
FIG. 5 illustrates a flowchart explaining a method for handling and managing digital documents when the E-mail or received dataset contains attachments and DTN from the sender and the file name of the DTN does not matches with the pre-defined naming convention and DDCA has to process all pages via applicable methodologies such as text extraction/OCR/ICR etc., for determining the DTN and extracting the relevant attributes, according to one embodiment herein.

FIG. 5 illustrates a flowchart explaining a method for handling and managing digital documents when the E-mail or received dataset contains attachments and DTN from the sender and the file name of the DTN does not matches with the pre-defined naming convention and DDCA has to process all pages via applicable methodologies for determining the DTN and extracting the relevant attributes, according to one embodiment herein. When the received E-mail contains DTN from the sender (501) and the DTN file name do not match with the pre-defined naming convention (502), then the DDC checks weather the attached DTN page size matches with the pre-defined size (i.e. A4 or Letter, Portrait orientation) or expected layout of the DTN as configured in the system (503). If the DTN file size does not matches with the pre-defined file size or expected layout as pre-configured in the application, then the DDC ends the process unsuccessfully by displaying a message DTN could not be found by either OCR or Text Extraction (504). The said message is sent to the Human Document Controller for validation, verification and error resolution.

According to one embodiment herein, if the DTN file size matches with the pre-defined file size (i.e. A4) or the layout of the DTN matches with the pre-configured layouts, then the DDC tries to extract the values using the PDF text extraction (505). If the DDC could not extract the values using the PDF text extraction, then the first page of the attached file is sent through the OCR to determine the DTN letter parameters as required for processing of the information (506). Similarly, if the DDC extracts the values using the PDF text extraction, then the extracted values from the first page of the document are compared with the expected DTN parameters (507) to identify the dataset for performing the transactions.

According to one embodiment herein, once the first page of the attached file is sent through the DTN letter parameters as specified in the OCR (able (506), then the DDC tries to get all the expected values of the DTN (508). If the DDC gets all the expected values of the DTN, then the DDC searches far a BA and extracts Record ID's and all associated field information for the process (509) and thereafter commences the steps from 410 to 414 (as shown in FIG. 4) for successfully completing the transaction. If the DDC does not get all the expected values of the DTN, the DDC again commences the processes with the different file that complies with the DTN Page Size specifications (503).

According to one embodiment herein, the DDC compares the extracted values with the DTN parameters (507) and if DDC gets all the expected values such as the Key—DTN No—is one such attribute—that will assist in unique determination of the DTN Letter—as what project code was earlier for determination of Project (510), then the DDC searches for a BA and extracts Record ID's and all associated fields information for the process (509). Similarly, if the DDC could not get all the expected values, then the DDC identifies the DTN number from the text extraction for the field with "KEY DTN No" and the value in the next rectangle (511) or as per the configuration that has been done for the expected DTN layouts, which is then used for determining and processing the acknowledgement letter.

Figure 6:
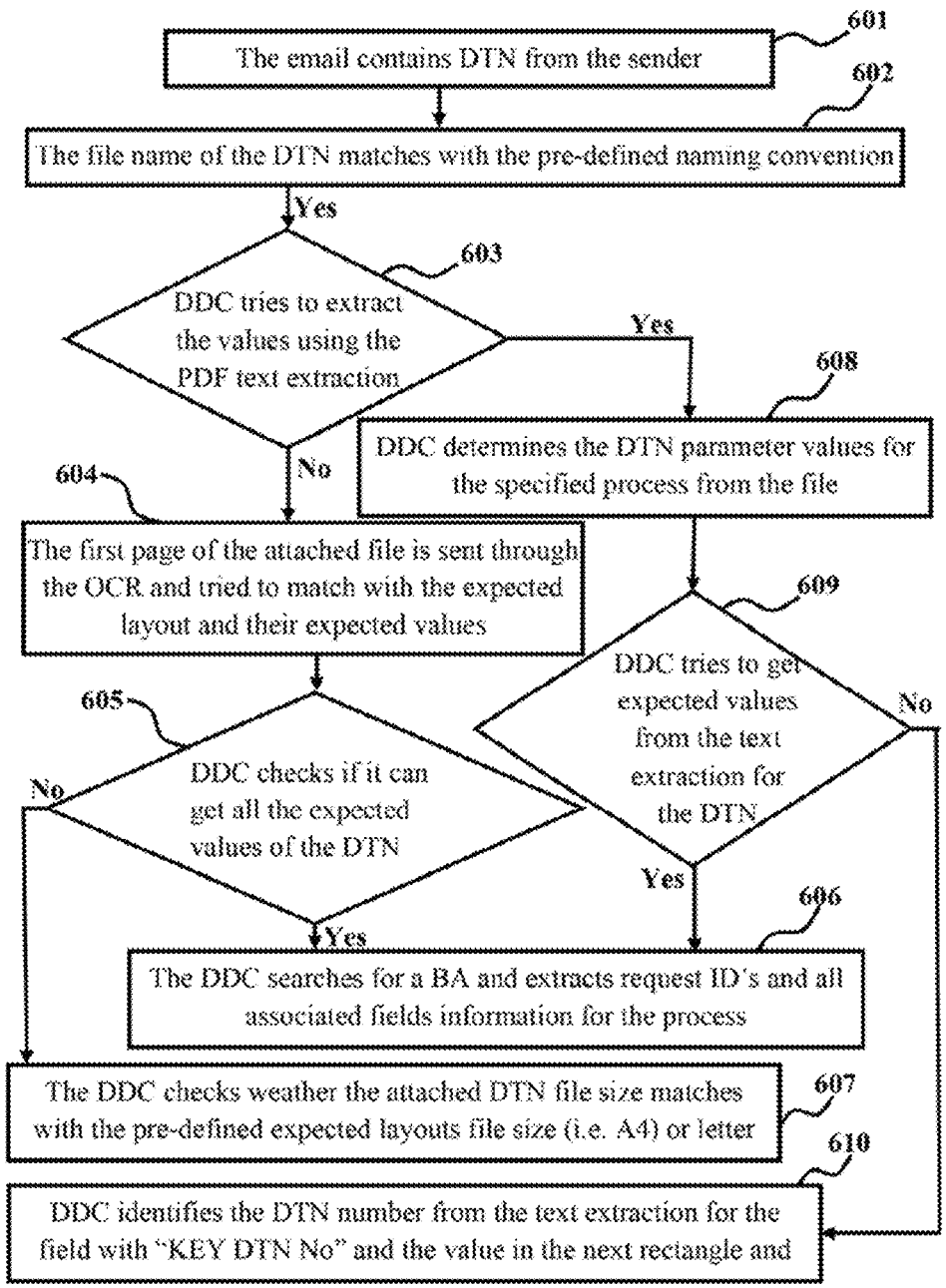
FIG. 6 illustrates a flowchart explaining a method for handling and managing digital documents when the E-mail contains attachments and DTN from the sender and the file name of the DTN matches with the pre-defined naming convention before the quality checks and the transactions are performed in the system, according to one embodiment herein.

FIG. 6 illustrates a flowchart explaining a method for handling and managing the digital documents when the received E-mail contains attachments and DTN from the sender and the file name of the DTN matches with the pre-defined naming convention until it gets to a stage of performing the quality checks and performing the transactions in the system, according to one embodiment herein. If the email (or digital files received from scanners, email servers, and various applications) contains attachments and the DTN letter from the sender (601) and if, the file name of the DTN matches with the pre-defined naming convention (602), then the DDC tries to extract the values using the PDF text extraction (603). If the DDC could not extract the values using the PDF text extraction, then the first page of the attached file is sent through the OCR and extracted text is compared with the parameters defined in the DTN letter parameters to identify the attributes required for performing the transactions. The expected attributes are stored in the databases where the complete expected layout information for received DTN's is also available and configured (604). The DDC checks if it can get all the expected values of the DTN (605). If the DDC gets all the expected values of the DTN, then the DDC searches for a BA and extracts Record ID's and all associated fields information for the process (606). If the DDC does not get all the expected values of the DTN, then the DDC again checks weather the attached DTN file size matches with the pre-defined file size (i.e. A4) or letter portraits settings (607). The process again continues as explained in FIG. 5 and upon successful determination of all parameters required for the determination of the document transmittal note, the DDC proceeds with the step 410 onwards as in FIG. 4.

According to one embodiment herein, if the DDC extracts the values using the PDF text extraction (603), then the DDC determines the DTN parameter values for the specified process from the file (608). The DDC then tries to Let expected values from the text extraction for the DTN (609). If DDC gets all the expected values from the text extraction for the DTN, then the DDC proceeds with searching for a BA and extracting Record ID's and all associated fields information for the process (606). If DDC does not get all the expected values from the text extraction for the DTN, then the DDC identifies the DTN number using the applicable OCR techniques while limiting the zones of the OCR by using prior knowledge about the expected layouts of DTN's and patterns contained in the same (610) which is used to determine if the file received is an acknowledgement letter and then moving forward to process the acknowledgement letter.

Figure 7:
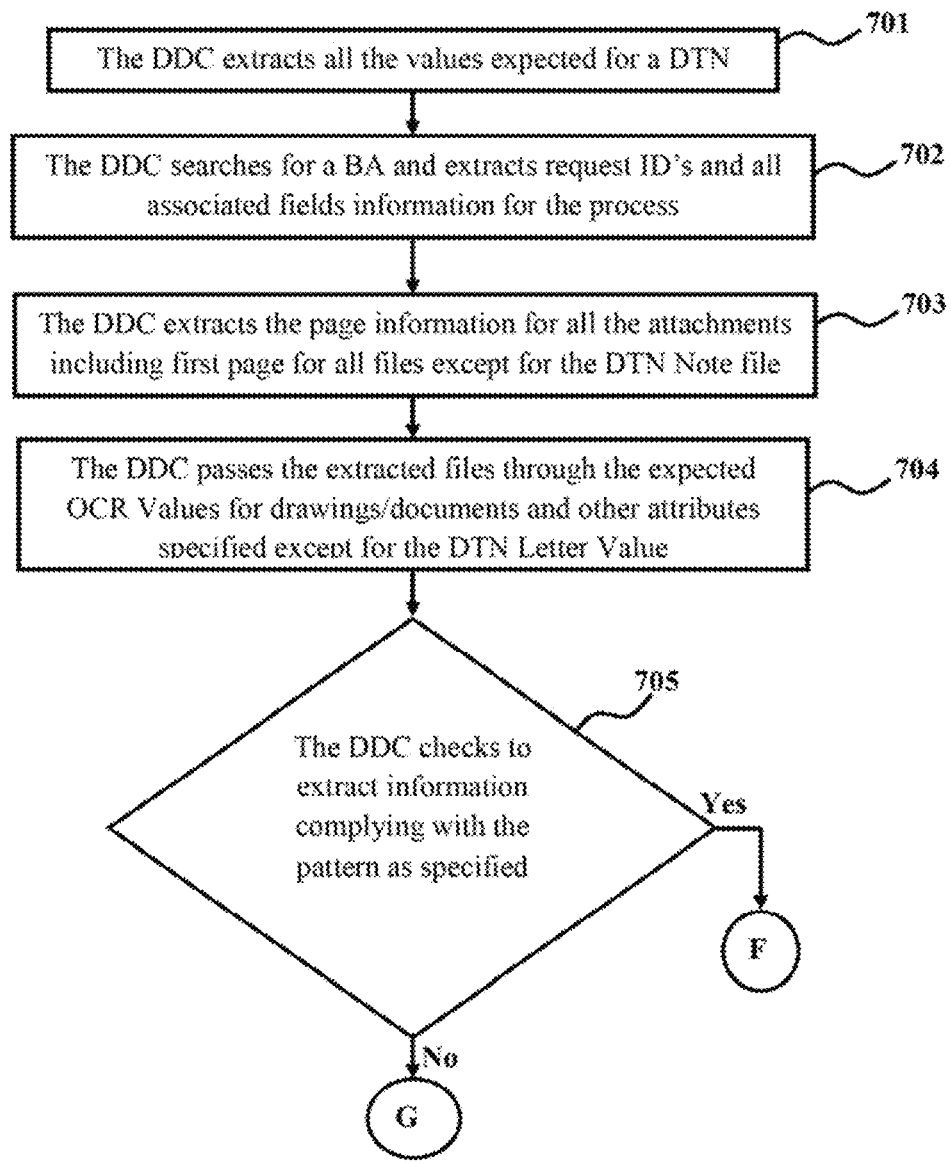
FIG. 7 illustrates a flowchart explaining a method tor handling and managing digital documents when all the values expected for a DTN is extracted with the system proceeding ahead with the quality checks and reconciliations between the records, according to one embodiment herein.

FIG. 7 illustrates a flowchart explaining a method for handling and managing digital documents in case all the values expected for a DTN is extracted and with the system proceeding ahead with the quality checks and reconciliations between the records, according to one embodiment herein. DDC is able to extract all the values expected for a DTN (701). If the DDC is able to extract all the values expected for a DTN, then the DDC searches for a BA and extract Record ID's and all associated fields information for the process (702). The DDC also extracts the page information for all the attachments including first page for all files except for the DTN Note file (703). The DDC then passes the extracted files through the expected OCR Values for drawings/documents and other attributes specified except for the DTN Letter Value (704). The DDC checks to extract information complying with the pattern as specified (expected OCR Values and other attributes) (705). If the DDC is able to extract information complying with the pattern as specified, then the DDC updates the information received in the "Hash MAP" that contains the information received from DTN and DMS records which is used for reconciliation of the data stated between the DTN and the files enclosed (706). The DDC checks weather it can get all the information requested for all the enclosed attachment files (707). Similarly, if the DDC is not able to extract information complying with the pattern as specified, then the DDC displays a message that, the identification information related to the file could not be extracted and hence it is NOT possible to determine the type of the file (708) and refers such cases to the human document controller for error resolution, validation and verification. The DDC checks weather it can get all the information requested for all the enclosed attachment files (707). If the DDC is able to successfully reconcile all the information, then the DDC proceeds with the quality checks and processing of the information as per the steps described in FIG. 4 (from step 410 onwards in FIG. 4).

According to one embodiment herein, if DDC does not get all the information requested for all the enclosed attachment files, then the DDC updates the inward record with files found, files that could not be processed and associated errors and finally STOPS the process (709). The DDC sends a message in parallel to the administrator of the Digital Document Controller (DDC) for requiring a Human intervention and the process ends unsuccessfully.

According to one embodiment herein, if DDC gets all the information requested for all the enclosed attachment files, then the DDC checks if it can reconcile all the files received with the information contained in the DTN or DMS records (710). If DDC could not reconcile all the received files, then the DDC update the record with the reconciliation results and STOPS the process and requests for human document controller for verification and error resolution (711). The DDC sends a message in parallel to the administrator of the DDC for requiring a Human intervention and the process ends unsuccessfully.

According to one embodiment herein, DDC reconciles all the files received with the information contained in the DTN or DMS records (710). If DDC reconciles all the files received with the information contained in the DTN or DMS records, then the DDC performs quality checks on the documents as per the required parameters (712). The process continues as explained in FIG. 4. The DDC updates the database and the associated records in accordance with the business rules as disclosed in the step 412 (as in FIG. 4). The DDC further creates the DTN Number using the information as applicable under the concerned transaction in the step 413 (as in FIG. 4). The DDC updates the created DTN Number in the Document Management System (DMS) with the success status as shown in the step 414 (as in FIG. 4).

Figure 8:
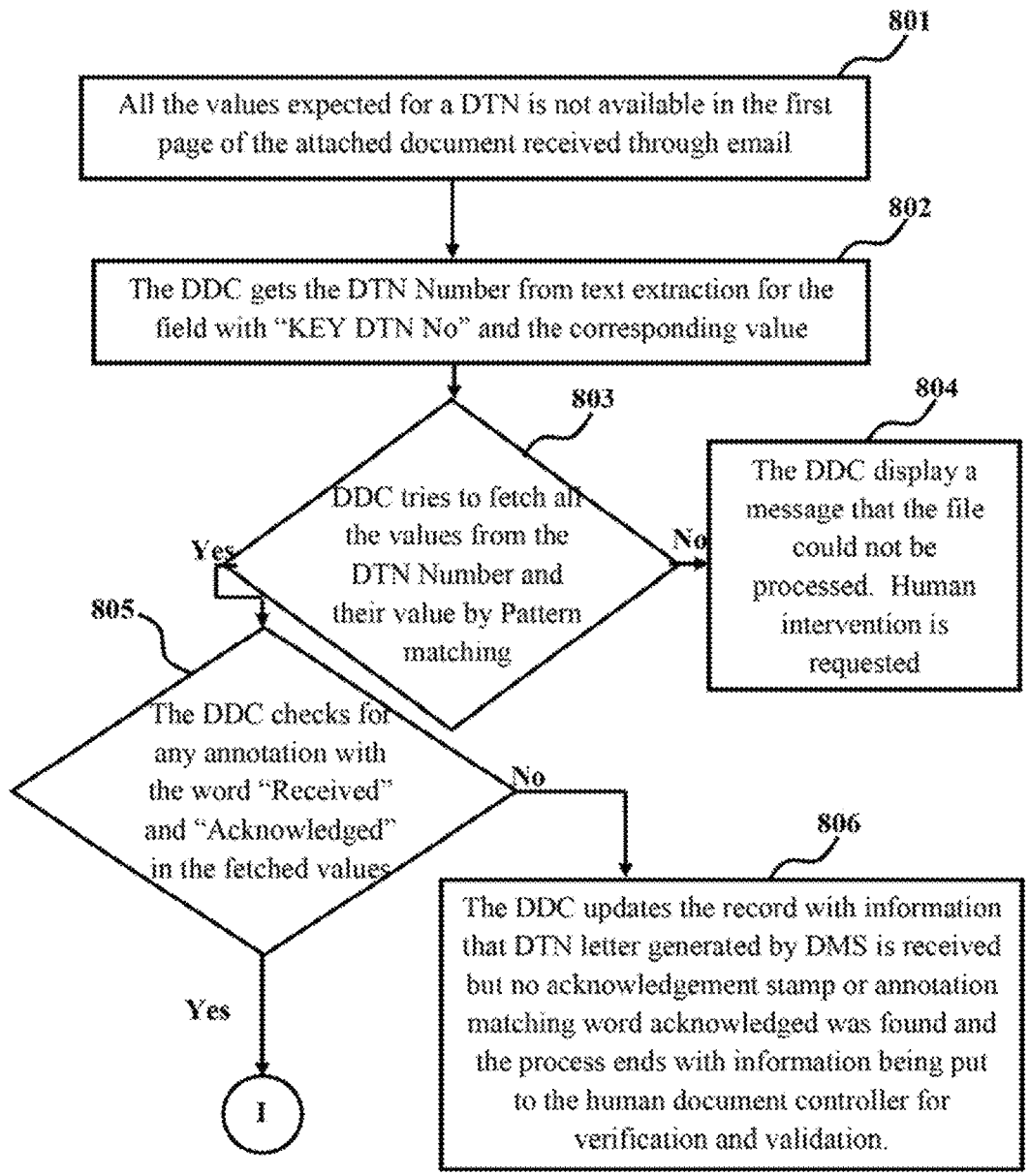
FIG. 8 illustrates a flowchart explaining a method for handling and managing digital documents when all the values expected for a DTN is not available and the DTN file seems to be the one that has been generated by application itself or by Digital Document Controller (DDC) incase the DTN is sent to the concerned agency and the details of DDC processing of the acknowledgement notes received from the emails is sent, according to one embodiment herein.

FIG. 8 illustrates a flowchart explaining a method for handling and managing digital documents in case all the values expected for a DTN is not available and the DTN file seems to be the one that has been generated by DDC itself when it has sent the DTN to the concerned agency and gives the details of how DDC processes the acknowledgement notes received from the emails, according to one embodiment herein. The DDC processes the acknowledgment notes received from the sender. When a DTN is sent along with the attachments, the receiving organization insets a stamp (that the attachment is received) on the received DTN Note and emails the same back to the sending organization. The DDC determines whether the email attachments (DTN notes) received are the same as what sent from the organization. If all the values expected for a DTN is not available in the first page of the attached document received through E-mail (801), then the DDC gets the DTN Number from text extraction for the field with "KEY DTN No" and the value in the next rectangle (802). The DDC tries to fetch all the values from the DTN Number and the value in the next rectangle (803). If DDC could not fetch the values, then the DDC display a message that the file could not be processed (804). The DDC sends a message in parallel to the administrator of the DDC for requiring a Human intervention and the process ends unsuccessfully (804).

According to one embodiment herein, if DDC fetches all the values from the DTN Number and the value in the next rectangle (803), then the DDC checks for any annotation with the word "Received" and "Acknowledged" in the fetched values (805). If DDC does not find any annotation with the word "Received" and "Acknowledged" or equivalent, then the DDC updates the record with information that DTN letter generated by DMS is received but no acknowledgement stamp or annotation matching word acknowledged was found and the process ends successfully (806).

According to one embodiment herein, if DDC finds annotation with the word "Received" and "Acknowledged" or equivalent (805), then the DDC checks weather the DTN letter is already acknowledged (807). If the DTN letter is not acknowledged, then the DDC acknowledge the receipt of the DTN Letter by updating the BA and associated steps and the process ends successfully (808). Similarly, if the DTN letter is already acknowledged, then the DDC updates the record in BA stating that, the DTN created by the DMS is received and the DTN has already been acknowledged (809). The DDC sends a message in parallel to the administrator of the DDC for requiring a Human intervention and the process ends unsuccessfully (810).

According to one embodiment herein, the DDC assists the human document controller in handling and controlling digital documents relating to a project workflow. The DDC monitors all communication between the organization and an external agency with respect to the project that are routed to its business area. The external agency refers to an organization, client, vendor, customer, individual and the like which is performing the project operation.

The embodiments herein provides a method for drastic increase in the productivity of the document controllers and document control departments by automating the various operations that are performed by them in compliance with the project and business standards.

The embodiments herein also improves the productivity of the human document controllers by explicitly telling them the constraints/issues encountered by the DDC in the respective files so that they only have to focus on exception handling and doesn't need to perform all quality checks again. The DDC gives a user interface where the part of the image, interpreted values and issues are highlighted for the human document controller to perform validations and based on human inputs—the system performs the transaction.

The embodiments herein works by matching the expected layouts of project drawings and documents with the patterns as identified in the incoming drawings and documents to retrieve the information of interest for performing the quality checks and performing the transactions. For defining the expected layouts of the engineering drawings and documents—the system of the present invention uses attributes as are encountered in the drawings as Vertical and Horizontal Lines, their distances from image edges, location of static texts/anchor texts, values of text strings that are nearest to the identified texts or are enclosed in rectangles or are bounded by certain other attributes, confirming to expected patterns or regular expressions etc. location of expected images that are put into drawings for giving decisions codes etc. To increase the probability of correctness in the OCR, the system uses prior knowledge about the language, nature of text expected (handwritten, typographic etc), regular expressions and dictionaries.

The embodiments herein also automates the quality checks that are to be done on the documents and drawings before the same are released to the other organizations or are accepted by the organization for further review (quality checks as layout of title blocks, borders, wet signatures etc).

The embodiments herein also reduces the risk associated with the errors that humans can perform in handling information as missed documents, incorrect data entry, lost documents etc and their associated consequential damages.

The embodiments herein also defines a method for the identification of the latest version of the drawings from printed copies using the mobile phones camera's to identify the codes as embedded on the digital file and using GPRS Connectivity.

The embodiments herein also completely automates the generation of the various documents that are required for transmitting the information from one agency to another without any human intervention including the creation of the transmittals, circulation of reports, creation of acknowledgement notes on the received documents, etc.

The embodiments herein also improves the enforcement of trust in between the various agencies by also transmitting the security code and/or file signatures based on MD5 and/or other cryptographic technologies along with the E-mails that can prevent the mis-representation of file information by any party in the required forums.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A Computer implemented method comprising instructions stored on a non-transitory computer readable storage medium and executed on a computing device provided with a hardware processor and a memory, for an automatic processing and management of technical digital documents and drawings, the method comprising steps of:

receiving one or more digital files of engineering digital documents and drawings from a plurality of sources, and wherein the plurality of sources is selected from a group consisting of scanners, email servers, applications and receiving one or more digital files of engineering digital documents and drawings using a plurality of methods, and wherein the plurality of methods comprises protocols, and wherein the protocols includes Web-based Distributed Authoring and Versioning (WebDav), and File Transfer Protocol (FTP);

creating a queue of the received engineering drawings and documents by creating a record in an incoming database for processing;

reading contents of the received one or more digital files to determine a project owning the one or more digital files of the engineering documents and drawings, and wherein the contents include a source of origination, and wherein the one or more digital files comprises a cover letter enclosed by a dispatching agency, one or more drawing files and one or more documents;

reading contents of the received cover letter;

reading attributes of the one or more drawing files and the one or more documents, and wherein the attributes includes contents provided in a Title Block of Drawings or Cover Page of Documents;

identifying attributes of the received one or more digital files using one or more image analysis techniques, and wherein the one or more image analysis techniques is selected from a group consisting of an edge detection technique, a line detection technique, a pattern recognition technique;

determining regions on the received one or more digital files for applying an optical character recognition process;

identifying an anchor text or anchor image and the anchor text values in the received one or more digital files by performing the optical character recognition and/or pattern matching technique;

performing quality checks on the identified attributes in the one or more digital files, dispatch cover sheets and previous transactions, and wherein the quality checks includes performing pattern validation, checking formats of title blocks that are used for creation of drawings, checking wet-signatures, checking hand written text and checking stamps put on the received one or more documents and drawings;

performing reconciliation between the identified attributes from the one or more digital files of the engineering documents and drawings and the attributes in the dispatched coversheets, and comparing the reconciliation information with stored information in an Organizational database with respect to a particular project;

applying one or more business rules, before accepting the received content and updating the organizational database for project documents;

wherein when a fidelity of the data identified from coversheets and/or received one or more digital files is less than a prescribed threshold value and/or missing data points or logical inconsistencies or identified at any point in a process flow, then the relevant data points are referred to a human document controller for validation, verification and error resolution, and wherein the transactions are further processed and executed based on the inputs of the human document controller, and wherein the prescribed threshold value is set by the human document controller.

2. The method according to claim 1, wherein the engineering documents comprises a plurality of digital files with a plurality of pages, and wherein the plurality of pages comprises one or more images, labels, text stamps.

3. The method according to claim 1, wherein an acknowledgment is sent to a recipient, when the one or more digital files of engineering documents and drawings are received and successfully updated in the organizational database of the engineering drawings and documents.

4. The method according to claim 1, wherein the pre-processing of the plurality of images comprises a processing of resolution, orientation, pattern identification, edge detection, and text identification of the plurality of images.

5. The method according to claim 1, wherein the one or more business rules are applied on the identified attributes of the one or more digital files of the engineering documents and drawings to carry out a quality check, and wherein the quality check comprises checking decision codes, checking stamps put onto a plurality of drawings and a plurality of documents, checking compliance with a file naming convention, checking a document numbering system protocols, revisions and previous transactions, and wherein the previous transactions include transactions that are performed on the same documents and drawings within project stakeholders, and wherein the documents and drawings are routed to a concerned person within organization for review after the quality check.

6. The method according to claim 1, wherein the attributes of the one or more digital files comprises a document or drawing number, a document or drawings revision, a decisions written on the documents, a title block pattern comprising project details, agencies involved in the project, sheet, scale information, Project Name and associated information.

7. The method according to claim 1, wherein the anchor text is a standard text or a pattern that is expected to be found in a specified class of the engineering drawings and documents at pre-determined regions based on prior knowledge about expected patterns being used m project and determining after matching patterns as enclosed in the engineering documents with expected patterns.

8. The method according to claim 1, wherein the human document controller is a person entrusted with the responsibility of checking all the incoming one or more digital files and the updation of the one or more digital files in the organizational database.

9. The method according to claim 1, wherein the format of the plurality of documents and drawings is changed in accordance with project standards, when the plurality of documents and drawings are sent from the document management system, and wherein changing of the format of the plurality of documents and drawings comprises steps of creating cover-pages, creating document transmittal notes, affixing decision stamps on the engineering drawings and documents, and embedding identification codes, and wherein the identification code is selected from a group consisting of QR Code, Bar code and Color code.

10. The method according to claim 1, wherein sending the error message to the human document controller comprises sending a nature of the error in a format suitable for understanding by the document controller, and sending a notification to the human document controller requesting a manual intervention in data validation, verification and error-resolution, and wherein the administrator can view identified regions of images and its interpreted text and can make necessary corrections.

11. The method according to claim 1, wherein identifying structures on the plurality of images comprises identifying edges of the plurality of images, horizontal lines, vertical lines, while spaces, tables, text-strings, date formats, paragraphs, phone numbers, currency, barcodes, colors and, collection of similar objects and repeatable patterns and stamps, and wherein the stamps includes decision codes.

12. The method according to claim 1, wherein the plurality of documents is structured documents and semi-structured documents.

* * * * *